US011679700B2

(12) United States Patent
Silipo

(10) Patent No.: US 11,679,700 B2
(45) Date of Patent: Jun. 20, 2023

(54) SEAT FOR TRANSPORT VEHICLES

(71) Applicant: FABRICACION ASIENTOS VEHICULOS INDUSTRIALES, S.A., Martorelles (ES)

(72) Inventor: Vicenzo Silipo, Alella (ES)

(73) Assignee: FABRICACION ASIENTOS VEHICULOS INDUSTRIALES, S.A., Martorelles (ES)

( * ) Notice: Subject to any disclaimer, the term of this patent is extended or adjusted under 35 U.S.C. 154(b) by 0 days.

(21) Appl. No.: 17/545,392

(22) Filed: Dec. 8, 2021

(65) Prior Publication Data
US 2022/0176851 A1 Jun. 9, 2022

(30) Foreign Application Priority Data
Dec. 9, 2020 (EP) .................................. 20383074

(51) Int. Cl.
*B60N 2/22* (2006.01)
*B64D 11/06* (2006.01)
(Continued)

(52) U.S. Cl.
CPC ............. *B60N 2/2222* (2013.01); *B60N 2/66* (2013.01); *B60N 2/853* (2018.02); *B60N 2/862* (2018.02); *B64D 11/0642* (2014.12)

(58) Field of Classification Search
CPC ...... B60N 2/862; B60N 2/2222; B60N 2/809; B64D 11/0642; B64D 11/0602; B64D 11/0606
See application file for complete search history.

(56) References Cited

U.S. PATENT DOCUMENTS

| 2004/0036336 A1* | 2/2004 | Veneruso ................. B60N 2/34 297/184.14 |
| 2017/0113578 A1 | 4/2017 | Shiraishi |
| 2019/0184879 A1 | 6/2019 | Kapusky et al. |

FOREIGN PATENT DOCUMENTS

| DE | 19957194 A1 | 5/2001 |
| EP | 1315637 B1 | 5/2006 |

(Continued)

OTHER PUBLICATIONS

European Search Report issued in counterpart EP Application No. 20383074 dated May 11, 2021 (one (1) page).

*Primary Examiner* — Timothy J Brindley
(74) *Attorney, Agent, or Firm* — E. Eric Mills; Maynard Nexsen PC

(57) ABSTRACT

A seat (1) for transport vehicles with an articulated frame (2) capable of moving and changing shape between a neutral position N and a comfort position C, which comprises a headrest portion (21) mechanically linked by means of a connector (22) to a connection area of a backrest portion (23) that changes the height position thereof as the frame (2) moves from the neutral position N to the comfort position C thereof, the connector (22) being suitable for this change in height position to be transmitted, by means of mechanical drag, to the headrest portion (21), the headrest portion (21) being mechanically linked by means of an upper guide unit (31) of a guide system to the chassis (4) which is configured such that the inclination of both the headrest portion (21) and the backrest portion (23) increase the inclination thereof with respect to the vertical as the frame (2) moves from the neutral position N to the comfort position C thereof.

10 Claims, 3 Drawing Sheets

(51) Int. Cl.
*B60N 2/862* (2018.01)
*B60N 2/853* (2018.01)
*B60N 2/66* (2006.01)

(56) References Cited

FOREIGN PATENT DOCUMENTS

| | | | |
|---|---|---|---|
| EP | 1470023 B1 | 9/2006 | |
| JP | 2006315623 A | 11/2006 | |
| JP | 2016199230 A | 12/2016 | |
| WO | WO-2015136727 A1 * | 9/2015 | ........... B64D 11/064 |
| WO | WO-2017080939 A1 * | 5/2017 | ......... B64D 11/0639 |

* cited by examiner

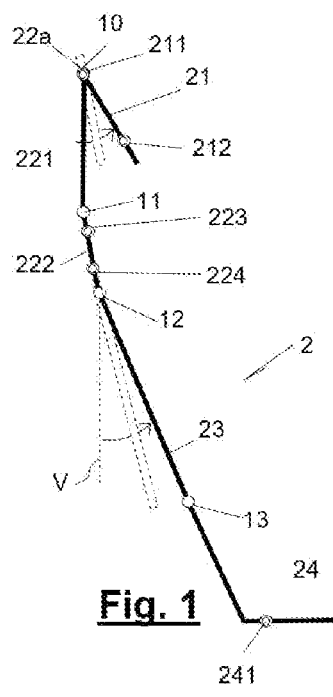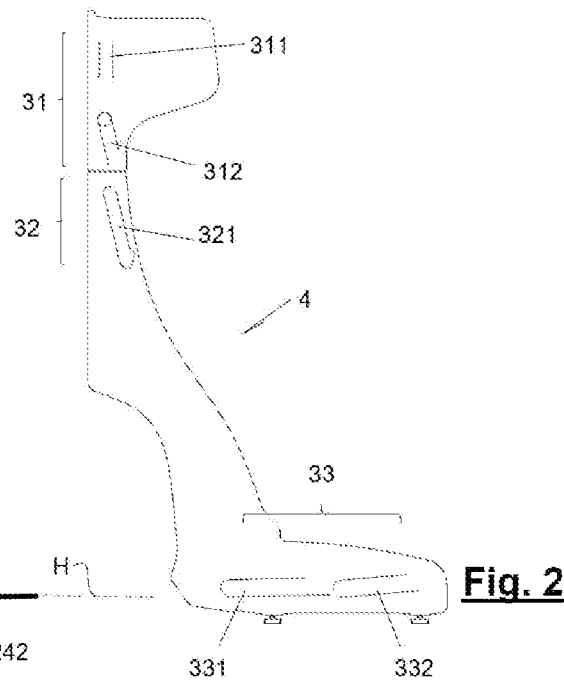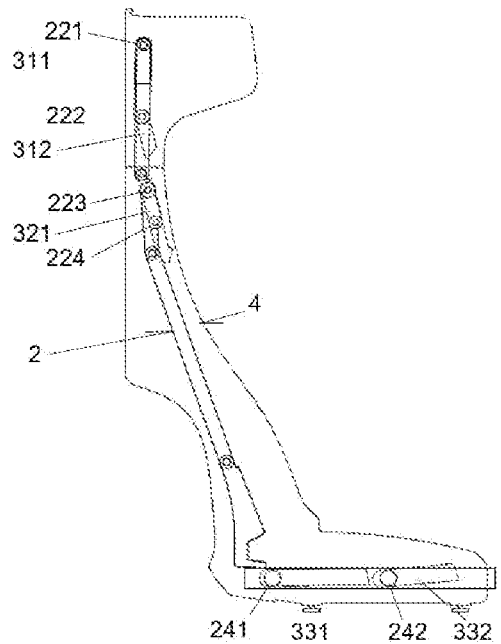

Neutral position N

Comfort position C

SEAT FOR TRANSPORT VEHICLES

CROSS REFERENCE TO RELATED APPLICATIONS

This application is a U.S. Non-Provisional Application which claims priority to European Patent Application No. 20383074.0 filed Dec. 9, 2020; the entirety of which is hereby incorporated by reference herein.

TECHNICAL FIELD OF THE INVENTION

The present invention relates to a seat for transport vehicles with an articulated and mobile frame, which gives the seat the ability to adopt various shapes to accommodate to the comfort level demanded by a user.

BACKGROUND OF THE INVENTION

At present, multiple proposals are known for seats which have some portion that serves as a support for the padding or the lining that is mobile with respect to a fixed structure or support chassis of the seat, in order to enable the seat to adapt to the morphology of a user or to their comfort preferences.

Seats for transport vehicles usually comprise a headrest portion that enables the user's head to be supported when he or she is sitting on the seat in a relaxed position and that can further perform a passive safety function avoiding the whiplash effect of a user's head in a sudden rearward movement in the event of an impact of the transport vehicle.

From patent document EP1470023 a seat assembly is known for holding an occupant in a motor vehicle. The seat assembly includes a cushion and a backrest portion. The backrest portion of the seat is operatively coupled to the seat cushion for the pivoting movement of the backrest portion around a first pivot axle relative to the seat cushion. The seat has a headrest portion that is also operatively coupled to the seat cushion, which enables a pivoting movement of this headrest portion around a second pivot axle relative to the seat cushion. This enables the inclination of the backrest and headrest portions to be adjusted independently and without the instantaneous position of one portion conditioning that of the other.

Proposals for seats, the headrest portion of which is mechanically connected to other portions of the seat in order to condition the position thereof to that assumed by these other portions of the seat, are known.

From patent document JP2006315623 a reclining mechanism of the headrest of a seat is known for automatically inclining it with respect to a backrest portion of the seat, specifically for inclining the headrest portion forward when the backrest portion inclines backwards, so that the distance between the occupant's head and the headrest remains at an approximately constant degree regardless of the adjustment position, i.e., the reclining angle, of the backrest portion of the seat. This solution is of interest for seats intended for being used by drivers of the vehicle, as it helps to keep the head in the ideal position, essentially vertical, regardless of the chosen inclination for the backrest portion. For vehicle passengers who are not required to keep their attention on the road, such as the occupants of the seats of a public transport vehicle, it may be of interest to seek a position of greater comfort, even if this means that the head is slightly inclined backwards as the inclination of the backrest portion of the seat increases.

Alternative proposals are known from patent documents EP1315637 and US20170113578 for a seat with a headrest portion that is pivotally coupled to an upper area of a backrest portion capable, in turn, of pivoting with respect to a seat portion between a use position and a folded position. The seat includes a mechanism that operatively interconnects the headrest portion to the backrest portion to provide automatic and continuous rotational movement of the headrest portion between an extended position of normal use and a retracted position in response to the rotational adjustment of the backrest portion between the use and folded positions thereof. In this case, the combined movement of the backrest portion and the seat portion is not aimed at improving the comfort of the passenger.

From patent document DE19957194 a seat is known with a backrest portion split into a lower half and an upper half, the relative angular position of which changes according to the inclination of the lower half of the backrest portion. The upper half encompasses a headrest and the seat comprises means for, in addition to changing the relative angular position between the lower and upper halves of the backrest portion, causing an upward movement of the said headrest by increasing the inclination of the lower half of the backrest portion.

An object of the present invention is an alternative seat that is capable of adopting several positions, one of them offering greater comfort at greater inclination of a backrest portion with respect to the vertical one. It is desirable that the seat can be implemented in a practical way, without too many mechanical or constructive complications. It is also desirable that the solution that enables these objectives to be achieved is compatible with seats of the type wherein changing the seat position from a neutral position to that of greater comfort does not involve an invasion of the space immediately behind the seat. The resulting seat would be of special interest for use in public transport vehicles wherein the comfort of a passenger cannot be detrimental to the comfort of the passenger occupying the space immediately behind.

DESCRIPTION OF THE INVENTION

The seat proposed is especially suitable for vehicles, and more specifically for transport vehicles with shared space, generally by unrelated users. An example is a public transport vehicle such as a train.

The seat is of the type that comprises a frame, articulated and linked by means of a guide system to a fixed structure or chassis that gives said frame the ability to move and change shape between a neutral position N and a comfort position C, the frame comprising a backrest portion that increases the inclination thereof with respect to the vertical as said frame moves from the neutral position N to the comfort position C.

In essence, the seat is characterised in that the frame comprises a headrest portion that is mechanically linked by means of a connector to a connection area of the backrest portion that changes the height position thereof as the frame moves from the neutral position N to the comfort position C thereof, the connector being suitable for this change in height position to be transmitted, by means of mechanical drag, to the headrest portion; and in that the headrest portion is also mechanically linked by means of an upper guide unit of the guide system to the chassis, said upper guide unit being configured so that the inclination of the headrest portion also increases the inclination thereof with respect to the vertical as the connector transmits to the headrest portion the motion of the frame from the neutral position N to the comfort position C thereof.

According to the invention, therefore, the inclination of the headrest portion is automatically adapted to the inclination of the backrest portion. Furthermore, all this without requiring an invasion of the space immediately behind the seat.

Thus, in one variant, the connector comprises a lower substructure, attached to the connection area of the backrest portion in a first middle articulated joint around a first middle axle transverse to the seat, the lower substructure further being mechanically linked by means of a middle guide unit of the guide system to the chassis; and an upper substructure, which extends from the lower substructure to an upper connection area of the headrest portion to which it is attached in an upper articulated joint around an upper axle transverse to the frame.

Preferably, the lower substructure and the upper substructure of the connector are attached in a second middle articulated joint around a second middle axle transverse to the frame, this second middle axle being located at a level above the first middle axle.

According to one variant of the invention, the upper guide unit of the guide system comprises on each side of the frame a set of guides with at least one upper guide, along which an upper headrest follower fixed in an upper area of the headrest portion runs; and a lower guide, along which a lower headrest follower fixed in a lower area of the headrest portion runs; the profile of the upper and lower guides of the upper guide unit being different.

In combination with the arrangement of the upper articulated joint in an upper connection area of the headrest, it contributes to providing the frame with the ideal kinematics for moving between the neutral position N and comfort position C thereof.

Preferably, the guide vector as defined in the description of the lower guide has a greater horizontal component than the guide vector of the upper guide.

In one variant, the upper headrest followers are axially aligned with the upper axle around which the headrest portion can rotate with respect to the connector.

All of this leads to a movement that does not require too much deformation of the padding or lining to which the frame serves as support.

In one variant, the middle guide unit comprises on each side of the frame a guide along which an upper follower and a lower follower run, fixed at different heights to the lower substructure of the connector. This contributes to a better performance of movements.

It is envisaged to select the position of the followers such that, with the frame adopting the neutral position N and comfort position C, the lower follower of the lower substructure of the connector is in an advanced position with respect to the upper follower of the lower substructure of the connector.

In one variant of interest, the frame comprises a seat portion connected to the backrest portion in a lumbar articulated joint around a lumbar axle, the seat portion being mechanically linked to the chassis by means of a lower guide unit that guides the movement thereof between a retracted neutral position and an advanced comfort position and which causes, by means of mechanical drag, the simultaneous inclination changes of the backrest portion and the headrest portion corresponding to the neutral position N and comfort position C of the frame.

BRIEF DESCRIPTION OF THE DRAWINGS

FIG. 1 is a schematic figure of an articulated frame for a seat according to the invention, wherein articulated knots and protruding or follower elements are distinguished;

FIG. 2 shows a fixed structure or chassis with a guide system specially configured for engaging the frame of FIG. 1, specifically for guiding the movement of the mobile portions thereof if the protrusions or follower elements of the frame are inserted into associated guides of the guide system, the assembly giving rise to a seat according to the invention;

FIG. 3 is a more realistic overlay of a frame analogous to that of FIG. 1 in a fixed structure analogous to that of FIG. 2, which enables the mutual relationship thereof to be shown;

DETAILED DESCRIPTION OF AN EMBODIMENT

Figure 4:
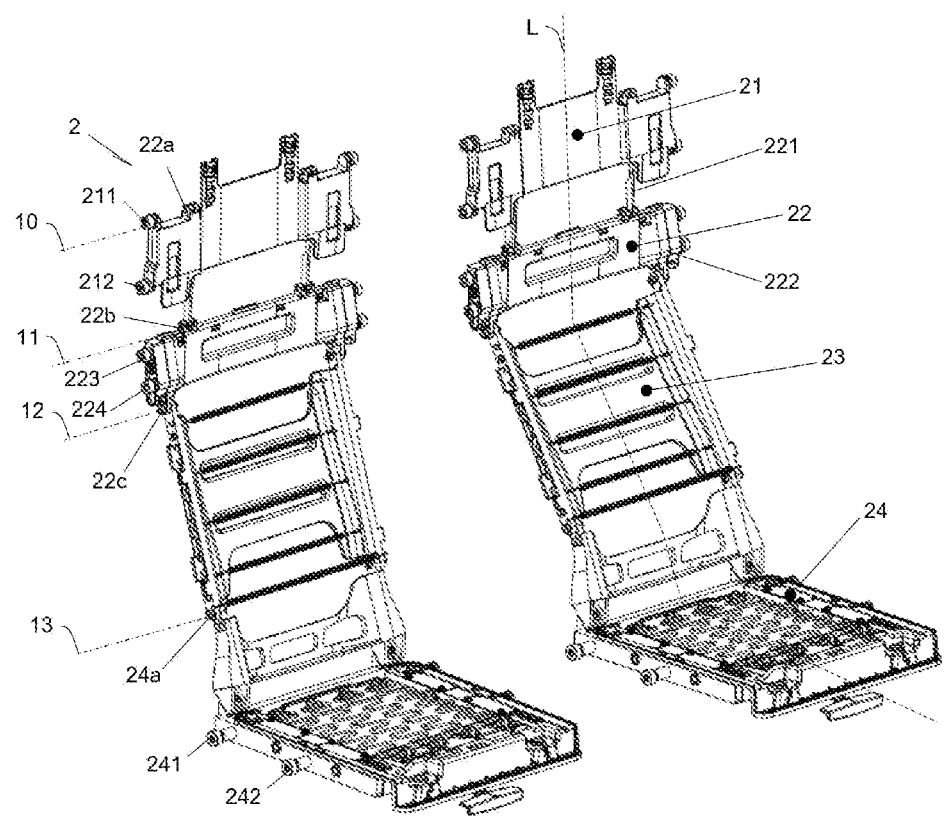
FIG. 4 shows a frame of a seat according to the invention in respective neutral and comfort positions, positions that are achieved by combining the frame with a guide system configured for this purpose, not illustrated.

FIG. 4 shows, by way of non-limiting example, a frame 2 suitable for implementing the present invention. The frame 2 is a structural frame, i.e., a core or skeleton, which serves as a support for the lining and/or padding that make up the soft portions of a seat, not shown.

This frame 2 has, for this purpose, a seat portion 24 on which the weight of a user will rest when sitting down; a backrest portion 23 sized for supporting the user's upper lumbar region and back; and a headrest portion 21, intended for offering a comfortable support for the user's head when the user sits in a relaxed position. It is specific to the frame 2 to have a connector 22, the function of which will be to mechanically link the backrest portion 23 with the headrest portion 21, so that the instantaneous position of the first conditions the instantaneous position of the second and that the movement of the first causes the movement of the second.

In the example, the seat portion 24, the backrest portion 23, the connector 22 and the headrest portion are concatenated in an articulated manner, in addition to the fact that the said connector 22 is made up of two portions, a lower substructure 222 and an upper substructure 221, also attached together in an articulated manner.

The seat portion 24, backrest portion 23 and headrest portion 21 may be integrated with the lining or padding that they support or may be portions that are fixed or attached thereto during the assembly of the seat 1. Likewise, the lining portions can offer continuity or be separate modules from the seat 1.

FIG. 1 is a schematic figure that facilitates the identification of these articulated joints, all of them around respective axles transverse to the frame 2 or to the seat 1 to which this frame will belong.

Obviously, the frame 2 is not supported in the air. This frame 2 is designed for engaging a fixed structure or chassis. This fixed structure or chassis may have or support a casing, formed in parts, by way of trim for covering the sides and the rear portion of the assembly formed by the frame 2 with the padding for which said frame acts as a core or skeleton.

What is relevant here is that the fixed structure or chassis matching the frame 2 to give rise to the seat 1 according to the invention supports a guide system that will determine the relative positions that the different portions of the frame 2 will adopt between each other.

FIG. 2 is a schematic figure of a fixed structure or chassis 4 that supports a guide system for this purpose. To function with the frame 2, it is provided with a series of guide protrusions or follower elements which, the seat 1 being assembled, will run inside the guides of the mentioned guide system.

The protrusions or follower elements are preferably arranged symmetrically on the frame 2, with respect to a longitudinal axis L (see FIG. 4). The guide system will comprise guides on both sides of the frame 2 to cooperate with the mentioned protrusions or follower elements. A preferred arrangement of the articulated connections of the frame, of the protrusions or follower elements and of the guides is described in greater detail below, with the aid of FIGS. 1 to 3.

As regards the articulated connections, the seat portion 24 and the backrest portion 23 are connected to each other in a lumbar articulated joint 24a around a lumbar axle 13; the backrest portion 23 and the lower substructure 222 of the connector 22 are connected to each other in a first middle articulated joint 22c around a first middle axle 12; the lower and upper substructures 222 and 221 of the connector 22 are connected to each other in a second middle articulated joint 22a around a second middle axle 11; and the upper substructure 221 of the connector 22, in the form of two braces oriented parallel to the longitudinal axis L, is connected to an upper connection area of the headrest portion 21 in an upper articulated joint 22a around an upper axle 10.

Regarding the arrangement of the guides of the guide system and the engagement thereof with the frame 2, the seat portion 24 is mechanically linked to the chassis 4 by means of a lower guide unit 33 which guides the movement thereof so that the frame 2 moves between a retracted neutral position N and an advanced comfort position C. Specifically, the seat portion 24 mounts, on each side, two protrusions or followers of which one is a rear follower 331 and the other is a front follower 332 which run along respective associated rear 331 and front 332 guides.

By follower the present invention refers to any protruding element suitable for being inserted and skidding, sliding or moving along a guide. It can be in the form of a projection or comprise wheels, skates or other elements that facilitate the sliding thereof supported on a guide surface. By guide, the present invention refers to any part or string that serves to force another part to follow a certain path when moving. The guides can be inserts or be built into the seat frame.

In the example, the configuration of the rear 331 and front 332 guides is such that they facilitate the movement of the seat portion 24 from a retracted neutral position to an advanced comfort position when the user, with the help of his or her weight, pushes the seat portion 24 forward, in a manner known per se in the art. In the same way, it is envisaged to fit the seat with means for retaining and enabling the movement of the seat portion 24, able to be manually actuated and in a manner known per se, and for this reason we do not expand on the description thereof. The motion of the seat portion 24 causes the movement by means of mechanical drag, and also the change of orientation as explained later, of the other portions of the frame 2 concatenated with each other.

In the example, the arrangement of the rear 331 and front 332 followers and the configuration of the associated rear 331 and front 332 guides is selected so that as the seat portion 24 moves from the retracted neutral position N to the advanced comfort position C thereof the said seat portion 24 also rotates slightly from an initial position with a first inclination ΦN with respect to the horizontal H until adopting a final position with a second inclination ΦC, greater than the first.

Continuing with the arrangement of the guides, the lower substructure 222 of the connector 22 is mechanically linked to the chassis 4 by means of a middle guide unit 32 which guides the movement thereof when it is moved in motion by the backrest portion 23 which in turn is moved in motion by the seat portion 24 as it moves between the retracted neutral position and advanced comfort position thereof. Specifically, the lower substructure 222 of the connector 22 mounts, on each side, a set of two guide protrusions or followers of which one is an upper follower 223 and the other is a lower follower 224 and wherein each set runs along a respective associated middle guide 321.

In the example, the lower follower 224 is in a slightly advanced position with respect to the upper follower 223 and the guide vector of the associated middle guide 321 has a suitable horizontal component so that when the seat portion 24 moves from the retracted neutral position to the advanced comfort position thereof and this drags the backrest portion 23 and the lower substructure 222 of the connector 22 in motion, the said backrest portion will rotate from a neutral position with a first inclination βN with respect to the vertical V to a comfort position with a second inclination βC, higher than the first, with respect to the vertical V. In FIG. 1, a possible neutral position for the backrest portion 23 has been represented with a dashed line and a possible comfort position has been represented with a solid line.

In the context of the present invention, guide vector is understood as the vector that results from joining the ends of a guide or, failing that, the end travel end points of the guide protrusion or follower or the set of guide protrusions or followers in the travel along the guide thereof and in the direction of movement caused as the frame 2 moves when the seat portion 24 moves from the retracted neutral position to the advanced comfort position thereof.

Moreover, the vertical V is the natural vertical of the seat being mounted in a vehicle that follows a horizontal advancement path with the seat mounted so that the user is facing in the advancement direction.

It is necessary to note, however, that FIG. 1 is a schematic figure, the purpose of which is to facilitate understanding of the invention. Therefore, neither the dimensional proportions between the frame portions nor the angular positions thereof with respect to the vertical V necessarily reflect those finally selected for implementing the invention. Actual angular positions and those of interest are exemplified below with reference to FIGS. 5a and 5b.

In any case, the arrangement of the lower 224 and upper 223 followers and the shape of the middle guide 321 determine the kinematics of the frame 2 and the selection thereof is such that the backrest portion 23 increases the inclination β thereof with respect to the vertical when moving from the mentioned neutral position to the comfort position; in addition to the fact that at least one portion of the backrest portion, which is selected as the connection area to the lower substructure 222 of the connector 22, also changes the height position thereof, in this case moving downwards.

Continuing with the arrangement of the guides, the headrest portion 21 is mechanically linked to the chassis 4 by means of an upper guide unit 31 that guides the movement thereof when it is moved in downward motion as it is dragged in motion by the connector 22, which in turn transmits the downward movement of the backrest portion 23 to which it is connected in an articulated manner when said backrest portion 23 moves from the neutral position to the comfort position thereof. Specifically, the backrest portion 21 mounts, on each side, a set of two guide protrusions or followers with an upper headrest follower 211 and a lower headrest follower 212 that run along respective associated upper 311 and lower 312 guides of the upper guide unit 31. It is envisaged that the upper 311 and lower guides 312 are short individual guides or sections attached without interruption of the same long guide.

In the example, the guide vector of the lower guide 312 has a greater horizontal component than the guide vector of the upper guide 311, so that the headrest portion 21 in addition to moving slightly downwards will change orientation, specifically it will also rotate from a neutral position with a first inclination αN with respect to the vertical V to a comfort position with a second inclination αC, greater than the first, with respect to the vertical V. In FIG. 1, a possible neutral position for the headrest portion 21 has been represented with a dashed line and a possible comfort position has been represented with a solid line. The correct location of the upper articulated joint 22a in an upper connection area of the headrest helps the movement of the headrest portion 21 to be as desired. In the example, the upper headrest followers 221 are axially aligned with the upper axle 10 around which the headrest portion 21 can rotate with respect to the connector 22.

As noted before, FIG. 1 is a schematic figure, the purpose of which is to facilitate understanding of the invention. Therefore, neither the dimensional proportions of the headrest portion and especially the angular positions thereof with respect to the vertical V necessarily reflect those finally selected for implementing the invention.

In any case, the arrangement of the lower and upper headrest followers 212 and 211 223 and particularly the shape of the associated lower and upper guides 312 and 311 condition the kinematics of the uppermost portion of the frame 2 and the selection thereof is such that the headrest portion 21 increases the inclination α thereof with respect to the vertical V when the backrest portion increases the inclination β thereof with respect to the vertical V.

Actual angular positions and those of interest, due to the ergonomics thereof, are exemplified below.

Figure 5A:
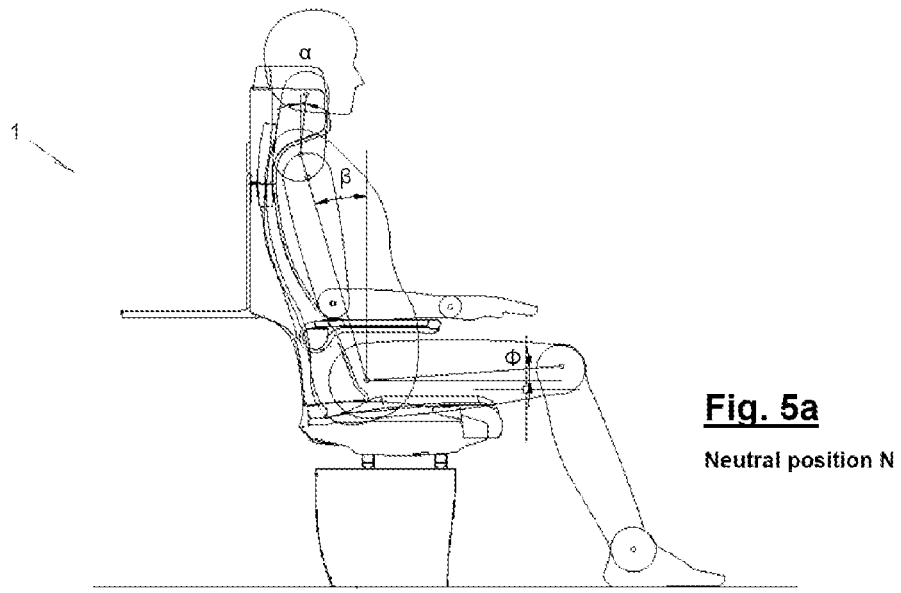
FIGS. 5a and 5b show a seat according to the invention in the neutral position and comfort position thereof.
Figure 5B:
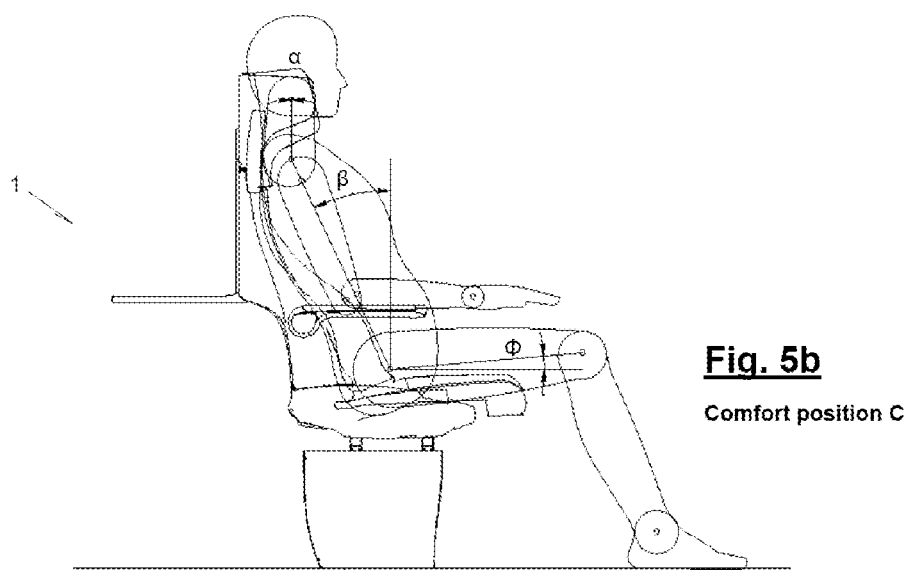

FIGS. 5a and 5b show a seat 1 according to the invention, the frame adopting the neutral position N and comfort position C thereof, respectively. Although the frame is not visible, the seat portion 24, backrest portion 23 and headrest portion 21 have been superimposed in the drawings. Likewise, the inclination angles Φ, β and α that this seat portion 24, backrest portion 23 and headrest portion 21 can each adopt with respect to their references have been indicated.

As explained before, the invention is designed so that both angles β and α increase when the frame moves from the neutral position N to the comfort position C thereof, all of this avoiding an unwanted invasion of the space immediately behind the seat 1, that is, without invading the space that a passenger sitting behind the seat might occupy.

In a variant, the angle Φ will vary between a value ΦN of 4° corresponding to the retracted neutral position N and a value ΦC of 6° corresponding to the advanced comfort position ΦC; the angle β will vary between a value βN of 16° corresponding to the neutral position N and a value βC of 31° corresponding to the comfort position C; while simultaneously the angle α will vary between a value αN of 0° corresponding to the neutral position N and a value αC of 5° corresponding to the comfort position C.

By playing with the geometries of the padding, both the travel start and end angles as well as the amplitude of the orientation changes can be varied.

The ergonomics that the seat will offer may in any case be tailored to the needs and space available at the destination of the seat.

For example, in another variant of the seat, the angle β will vary between a value βN of 21° corresponding to the neutral position N and a value βC of 38° corresponding to the comfort position C; while simultaneously the angle α will vary between a value αN of 5° corresponding to the neutral position N and a value αC of 7° corresponding to the comfort position C, all of which also slightly increases the angle Φ of the seat portion 24.

The invention claimed is:

1. A seat (1) for transport vehicles, with a frame (2) articulated and linked by means of a guide system to a fixed structure or chassis (4) that gives said frame the ability to move and change shape between a neutral position N and a comfort position C, the frame comprising a backrest portion (23) that increases the inclination thereof with respect to the vertical as said frame moves from the neutral position N to the comfort position C, the seat being characterised in that the frame (2) comprises a headrest portion (21), the headrest portion (21) being mechanically linked by means of a connector (22) to a connection area of the backrest portion (23) that changes the height position thereof as the frame (2) moves from the neutral position N to the comfort position C thereof, the connector (22) being suitable for this change in height position to be transmitted, by means of mechanical drag, to the headrest portion (21), and the headrest portion (21) being also mechanically linked by means of an upper guide unit (31) of the guide system to the chassis (4), said upper guide unit (31) being configured so that the inclination of the headrest portion (21) also increases the inclination thereof with respect to the vertical as the connector (22) transmits to the headrest portion (21) the motion of the frame (2) from the neutral position N to the comfort position C thereof, wherein the connector (22) comprises:

a lower substructure (222), attached to the connection area of the backrest portion (23) in a first middle articulated joint (22c) around a first middle axle (12) transverse to the seat (1), the lower substructure (222) further being mechanically linked by means of a middle guide unit (32) of the guide system to the chassis (4), and an upper substructure (221), which extends from the lower substructure (222) to an upper connection area of the headrest portion (21) to which it is attached in an upper articulated joint (22a) around an upper axle (10) transverse to the frame (2).

2. The seat (1) according to claim 1, characterised in that the lower substructure (222) and the upper substructure (221) of the connector (22) are attached in a second middle articulated joint (22b) around a second middle axle (11) transverse to the frame (2), this second middle axle (11) being located at a level above the first middle axle (12).

3. The seat (1) according to claim 1, characterised in that the upper guide unit (31) of the guide system comprises on each side of the frame (2) a set of guides with at least one upper guide (311), along which an upper headrest follower (211) fixed in an upper area of the headrest portion (21) runs; and a lower guide (312), along which a lower headrest follower (212) fixed in a lower area of the headrest portion (21) runs; the profile of the upper and lower guides (312, 312) of the upper guide unit (31) being different.

4. The seat (1) according to claim 3, characterised in that a guide vector as defined in the description of the lower guide (312) has a greater horizontal component than a guide vector of the upper guide (311).

5. The seat (1) according to claim 3, characterised in that the upper headrest followers (211) are axially aligned with the upper axle (10) around which the headrest portion (21) can rotate with respect to the connector (22).

6. The seat (1) according to claim 1, characterised in that the middle guide unit (32) comprises on each side of the frame a guide (321) along which an upper follower (223) and a lower follower (224) run, fixed at different heights to the lower substructure (222) of the connector (22).

7. The seat according to claim 6, characterised in that, the frame (2) adopting the neutral position N and comfort position C, the lower follower (224) of the lower substructure (222) of the connector (22) is in an advanced position with respect to the upper follower (223) of the lower substructure (222) of the connector (22).

8. The seat (1) according to claim 1, characterised in that the frame (1) comprises a seat portion (24) connected to the backrest portion (23) in a lumbar articulated joint (24a) around a lumbar axle (13), the seat portion (24) being mechanically linked to the chassis (4) by means of a lower guide unit (33) that guides the movement thereof between a retracted neutral position and an advanced comfort position and which causes, by means of mechanical drag, the simultaneous inclination changes of the backrest portion (23) and the headrest portion (21) corresponding to the neutral position N and comfort position C of the frame (2).

9. The seat (1) for transport vehicles according to claim 1, wherein the profile of the upper and lower guides (312, 312) of the upper guide unit (31) are different.

10. A seat (1) for transport vehicles, with a frame (2) articulated and linked by means of a guide system to a fixed structure or chassis (4) that gives said frame the ability to move and change shape between a neutral position N and a comfort position C, the frame comprising a backrest portion (23) that increases the inclination thereof with respect to the vertical as said frame moves from the neutral position N to the comfort position C, the seat being characterised in that the frame (2) comprises a headrest portion (21), the headrest portion (21) being mechanically linked by means of a connector (22) to a connection area of the backrest portion (23) that changes the height position thereof as the frame (2) moves from the neutral position N to the comfort position C thereof, the connector (22) being suitable for this change in height position to be transmitted, by means of mechanical drag, to the headrest portion (21), and the headrest portion (21) being also mechanically linked by means of an upper guide unit (31) of the guide system to the chassis (4), said upper guide unit (31) being configured so that the inclination of the headrest portion (21) also increases the inclination thereof with respect to the vertical as the connector (22) transmits to the headrest portion (21) the motion of the frame (2) from the neutral position N to the comfort position C thereof, wherein the upper guide unit (31) of the guide system comprises on each side of the frame (2) a set of guides with at least one upper guide (311), along which an upper headrest follower (211) fixed in an upper area of the headrest portion (21) runs; and a lower guide (312), along which a lower headrest follower (212) fixed in a lower area of the headrest portion (21) runs.

\* \* \* \* \*